US010855561B2

(12) United States Patent
Monahan et al.

(10) Patent No.: US 10,855,561 B2
(45) Date of Patent: Dec. 1, 2020

(54) PREDICTIVE SERVICE REQUEST SYSTEM AND METHODS

(71) Applicant: Oracle International Corporation, Redwood Shores, CA (US)

(72) Inventors: Michael Monahan, Louisville, CO (US); Matthew Lee Maddox, Erie, CO (US)

(73) Assignee: Oracle International Corporation, Redwood Shores, CA (US)

( * ) Notice: Subject to any disclaimer, the term of this patent is extended or adjusted under 35 U.S.C. 154(b) by 498 days.

(21) Appl. No.: 15/098,521

(22) Filed: Apr. 14, 2016

(65) Prior Publication Data
US 2017/0302540 A1   Oct. 19, 2017

(51) Int. Cl.
H04L 12/24    (2006.01)

(52) U.S. Cl.
CPC ...... H04L 41/5074 (2013.01); H04L 41/5038 (2013.01); H04L 41/5051 (2013.01)

(58) Field of Classification Search
CPC .... H04L 41/5074; H04L 41/065; G06F 17/50
See application file for complete search history.

(56) References Cited

U.S. PATENT DOCUMENTS

| 8,352,469 | B2 * | 1/2013 | Rose | G06F 17/277 |
| | | | | 706/45 |
| 2008/0155564 | A1 * | 6/2008 | Shcherbina | G06Q 10/04 |
| | | | | 719/318 |
| 2010/0082620 | A1 * | 4/2010 | Jennings, III | G06F 16/285 |
| | | | | 707/736 |
| 2012/0066547 | A1 * | 3/2012 | Gilbert | H04L 41/065 |
| | | | | 714/26 |
| 2012/0191630 | A1 * | 7/2012 | Breckenridge | G06N 20/00 |
| | | | | 706/12 |
| 2013/0262082 | A1 * | 10/2013 | McKeeman | G06F 16/3344 |
| | | | | 704/9 |
| 2014/0129536 | A1 * | 5/2014 | Anand | G06Q 10/0635 |
| | | | | 707/706 |

(Continued)

OTHER PUBLICATIONS

Bogojeska, Jasmina, et al. "Impact of HW and OS type and currency on server availability derived from problem ticket analysis." 2014 IEEE Network Operations and Management Symposium (NOMS). IEEE, 2014. (Year: 2014).*

(Continued)

*Primary Examiner* — Omar F Fernandez Rivas
*Assistant Examiner* — David A Hopkins
(74) *Attorney, Agent, or Firm* — Kilpatrick Townsend & Stockton LLP

(57) ABSTRACT

In some embodiments, a method is provided that includes one or more of the following features including creating service request outcome models each being based on a service request outcome. A service request entered using natural language can be received and tokenized. A binary matrix can be created from the tokenized service request, and a service request outcome model can be identified based on the binary matrix. The service request outcome model can be used to identify a service request category, a service request predicted resolution, and a service request diagnostic. A confidence value can be calculated based on the service request predicted resolution. The service request category, the service request predicted resolution, and the service request diagnostic can be transmitted to an automated service request resolution system to resolve the service request.

21 Claims, 10 Drawing Sheets

(56) References Cited

U.S. PATENT DOCUMENTS

| | | | | |
|---|---|---|---|---|
| 2014/0244816 | A1* | 8/2014 | Anerousis | H04L 41/065 709/223 |
| 2014/0350989 | A1* | 11/2014 | Telatar | G06Q 10/20 705/7.21 |
| 2015/0170040 | A1* | 6/2015 | Berdugo | G06F 17/30707 706/11 |
| 2015/0227559 | A1* | 8/2015 | Hatami-Hanza | G06F 17/30292 707/748 |
| 2017/0019291 | A1* | 1/2017 | Tapia | G06N 20/00 |
| 2017/0212756 | A1* | 7/2017 | Ryali | G06F 8/77 |

OTHER PUBLICATIONS

Diao, Yixin, Hani Jamjoom, and David Loewenstern. "Rule-based problem classification in it service management." 2009 IEEE International Conference on Cloud Computing. IEEE, 2009. (Year: 2009).*

Gupta, Rajeev, et al. "Multi-dimensional knowledge integration for efficient incident management in a services cloud." 2009 IEEE International Conference on Services Computing. IEEE, 2009. (Year: 2009).*

Wilbur, W. John, and Karl Sirotkin. "The automatic identification of stop words." Journal of information science18.1 (1992): 45-55. (Year: 1992).*

Stack Overflow, scikit learn—Using Categorical Features along with Text for classification, Sep. 2015, Accessed at: https://stackoverflow.com/questions/32621947/using-categorical-features-along-with-text-for-classification (Year: 2015).*

SciKit User Guide and Related Documentation, Accessed via WayBack Machine, Archived 2016, Accessed through: https://scikit-learn.org/ (Year: 2016).*

Oracle Auto Service Request, Oracle Data Sheet, Copyright © 2014, 2 pages.

* cited by examiner

PREDICTIVE SERVICE REQUEST SYSTEM AND METHODS

BACKGROUND OF THE INVENTION

Customers that need to enter service requests are often forced to interact with support systems and teams to define and clarify a problem. The costs of support personnel can be substantial. Current support solutions involve the use of self-help and decision trees to guide a customer to a resolution, which shifts the work from support to the customer. This still involves human time and energy to resolve support issues. Systems are needed to reduce the amount of human time required to resolve service requests.

BRIEF SUMMARY OF THE INVENTION

In some embodiments, a method can be used that includes one or more of the following features including creating service request outcome models each being based on a service request outcome. A service request entered using natural language can be received and tokenized. A binary matrix can be created from the tokenized service request, and a service request outcome model can be identified based on the binary matrix. The service request outcome model can be used to identify a predicted service request category, a predicted service request resolution, and a predicted service request diagnostic. A confidence value can be calculated based on the predicted service request resolution. The predicted service request category, the predicted service request resolution, and the predicted service request diagnostic can be transmitted to an automated service request resolution system to resolve the service request.

In some embodiments, the features may also include identifying a service request part value based on the service request outcome model, and the service request part value can be transmitted to the automated service request resolution system. In some embodiments the method can also include receiving a second service request entered using natural language. The second service request can be tokenized, and a second binary matrix can be created based on the tokenized second service request. A second service request outcome model can be identified based on the second binary matrix. A second predicted service request category, a second predicted service request resolution, and a second predicted service request diagnostic can be identified based on the second service request outcome model. A second confidence value can be calculated based on the second predicted service request resolution. A technical support team can be identified based on the second predicted service request category, and the second service request can be transmitted to the technical support team to resolve the service request.

In some embodiments, the method can also include creating a modified service request outcome model based on the binary matrix, and adding the modified service request outcome model to the service request outcome models. In some embodiments, the method can also include eliminating stop words based on a custom dictionary from the service request prior to tokenizing the service request. In some embodiments, upon receipt of the predicted service request category, the predicted service request resolution, the predicted service request diagnostic, and the predicted service request part value at the automated service request resolution system, a service request part is automatically ordered based on the service request part value and an installation technician is automatically scheduled to install the service request part. In some embodiments, the method may also include receiving metadata regarding the service request including at least two of an event code, a product name, a serial number, and a problem category.

In some embodiments, a system can include a processor and a memory storing instructions that cause the processor to create service request outcome models each being based on a service request outcome. The instructions can also cause the processor to receive a service request entered with natural language, tokenize the service request, and create a binary matrix based on the tokenized service request. The instructions can also cause the processor to identify a service request outcome model based on the binary matrix, and, based on the service request outcome model, identify a predicted service request category, a predicted service request resolution, and a predicted service request diagnostic. The instructions can also cause the processor to calculate a confidence value based on the predicted service request resolution and transmit the predicted service request category, the predicted service request resolution, and the predicted service request diagnostic to an automated service request resolution system to resolve the service request.

The instructions can also cause the processor to include one or more of the following features: identify a predicted service request part value based on the service request outcome model and transmit the predicted service request part value to the automated service request resolution system. Receive a second service request entered using natural language and tokenize the second service request. Create a second binary matrix based on the tokenized second service request and identify a second service request outcome model based on the second binary matrix. Identify a second predicted service request category, a second predicted service request resolution, and a second predicted service request diagnostic based on the second service request outcome model and calculate a second confidence value of the identified second predicted service request resolution. Identify a technical support team based on the second predicted service request category and transmit the second service request to the technical support team to resolve the service request.

The instructions can also cause the processor to include one or more of the following features: Create a modified service request outcome model and add the modified service request outcome model to the available service request outcome models. Eliminate stop words based on a custom dictionary from the service request prior to tokenizing the service request. Upon receipt of the predicted service request category, the predicted service request resolution, the predicted service request diagnostic, and the predicted service request part value at the automated service request resolution system, a service request part can be automatically ordered based on the predicted service request part value and an installation technician can be automatically scheduled to install the service request part. Receive metadata regarding the service request including at least two of an event code, a product name, a serial number, and a problem category.

BRIEF DESCRIPTION OF THE DRAWINGS

Illustrative embodiments of the present invention are described in detail below with reference to the following drawing figures.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Many service request systems include extensive human interaction to identify, classify, and resolve service request issues. While some support systems exist that utilize self-help and decision tree based solutions, they only shift the work from the support personnel to the customer. Further, many hardware and software systems are designed to fail predictably. For that reason, statistical based models, device telemetry data, and natural language processing can be used to classify customer support issues and automatically engage a suitable resolution. The result is a support system that significantly decreases or eliminates the need for human intervention for identification, classification, and resolution of support issues.

Figure 1:
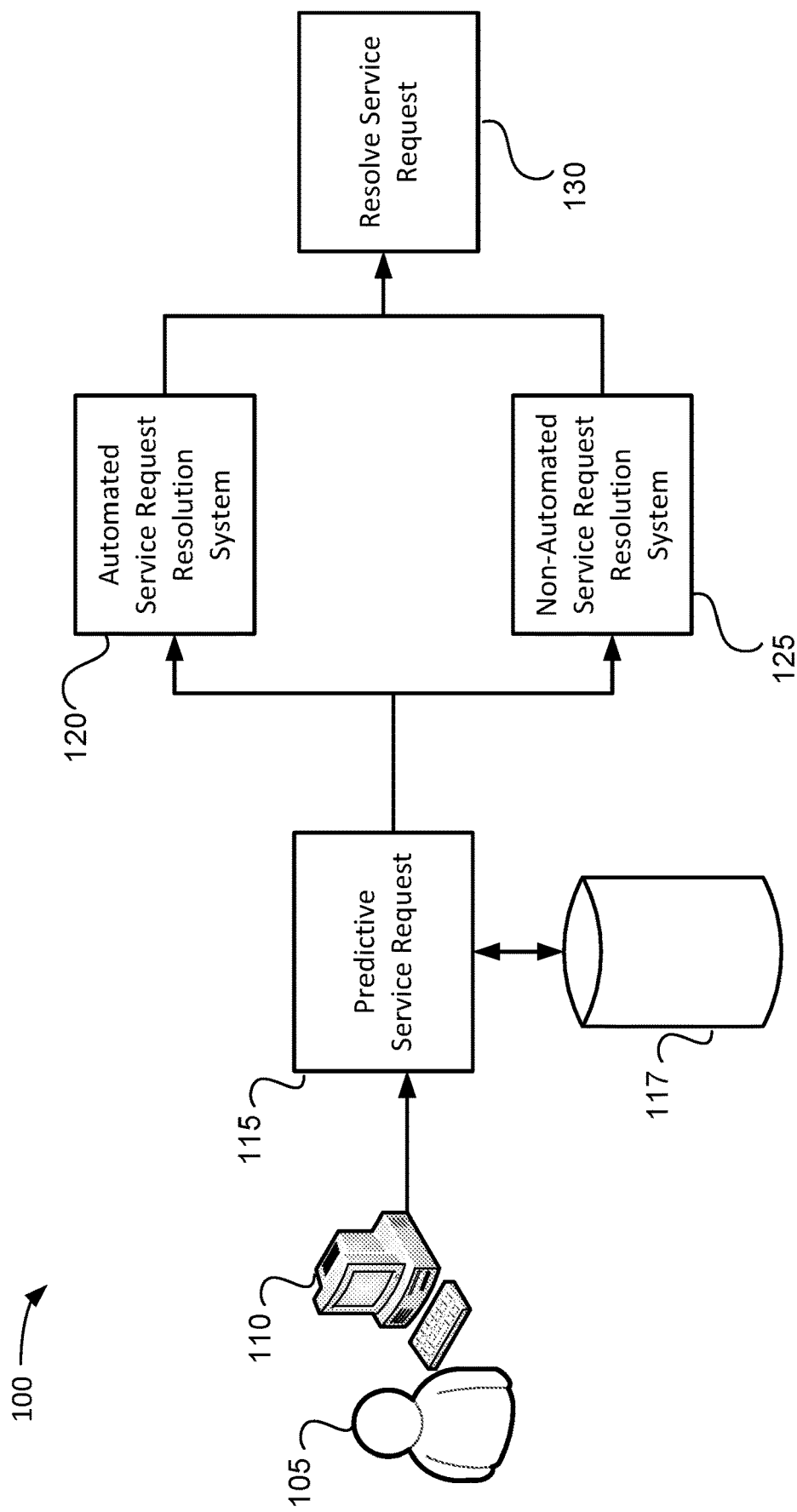
FIG. 1 depicts a simplified diagram of a service request resolution system, including a predictive service request system, according to an embodiment.

FIG. 1 depicts a simplified diagram of a service request resolution system 100. The service request resolution system 100 can include a user 105, with a user computer system 110, a predictive service request system 115, a database 117, an automated service request resolution system 120, a non-automated service request resolution system 125, and a process for resolving the service request 130.

In some embodiments, a user 105 can determine that there is an issue with a hardware or software component of a computer system used by user 105. The user 105 can submit a service request using user computer system 110. User computer system 110 can be any suitable computer system such as that described in more detail with respect to FIG. 10. The service request can be entered using natural language. In some embodiments, the service request can be entered using an electronic form. The electronic form can allow the entry of a natural language request. In some embodiments, the electronic form can include specific questions to allow the user to provide specific information. The submission of the service request can send the service request to the predictive service request system 115. The predictive service request system 115 can be any suitable computer system, such as that described with respect to FIG. 10. As described with respect to FIG. 10, the predictive service request system 115 can be coupled to the user computer system 110 through a network, allowing the submission of the electronic form. Transmission or submission of data through the network between computer systems can be done using a communications subsystem 1024 as described in FIG. 10. Each computing system can include a processor or processing unit (e.g., processing unit 1004), which can include instructions for execution that cause the processor to instruct the communication subsystem to transmit data, and the processor can process and/or access data received through the communication subsystem.

Upon submission of the service request, the predictive service request system 115 can receive the service request and process the service request. The predictive service request system 115 can process the service request to determine whether to port the service request to the automated service request resolution system 120 or the non-automated service request resolution system 125. For example, upon receiving the service request, which in some embodiments is entered using natural language, the predictive service request system can tokenize the service request.

Prior to tokenizing the service request, in some embodiments, the predictive service request system 115 can remove stop words from the service request. For example, in some embodiments, extraneous words can be removed such as "a," "the," and "and." Additionally, a custom dictionary can be used by the predictive service request system 115 to remove specific words that are known to be too general or otherwise unhelpful or undesirable. For example, in some embodiments the custom dictionary can contain the words "system" and "help" such that any service request that is received will have the words "system" and "help" removed prior to tokenizing the service request.

The predictive service request system 115 can, in some embodiments, obtain additional information from metadata or other data from the user computer system 110 or from the computer system that includes the hardware or software used by the user that is the subject of the service request. In such embodiments, the additional information can also be tokenized. In some embodiments, the additional information can also have stop words removed.

Once the predictive service request system 115 obtains and tokenizes all the relevant information from the service request and the additional information, the tokenized data from all sources can be combined and the predictive service request system 115 can build a binary matrix based on the tokenized data. The matrix can be a sparse matrix. The binary matrix can include an entry for each token of the tokenized data. The binary matrix can then be run against a database of service request outcome models 117. The service request outcome model that best fits the binary matrix can be selected from the database of service request outcome models 117. The service request outcome models can include information that can resolve the service request. The service request outcome model can identify a predicted service request category, a predicted service request resolution, a predicted service request diagnostic, and/or a predicted service request part. In some embodiments, the predicted service request category can identify a problem type, and in some embodiments the predicted service request category can identify a problem type and a required part. The predictive service request system 115 can calculate a confidence score of the predictions based on how well the binary matrix fits the selected service request outcome model. If the confidence score is above a threshold, the predictive service request system 115 can transmit the predicted service request category, the predicted service request resolution, the predicted service request diagnostic, and/or the predicted service request part to the automated service request resolution system 120. The threshold value can be entered during a configuration of the predictive service request system 115. The threshold value can be specified at product, support group, or outcome level.

Providing the predicted service request category, the predicted service request resolution, the predicted service request diagnostic, and/or the predicted service request part to the automated service request resolution system relieves the need for the user to provide detailed information to the automated service request resolution system in a specific format for which it requires data entry. The prediction of the service request resolution based on the user's natural language entry of the information allows the user 105 to provide, in his or her own words, a description of the problem. The predictive service request system 115 can utilize the database of service request outcome models 117 to identify the likely problem and resolution and provide the necessary information to the automated service request resolution system in the format required by the automated service request resolution system 120.

In some embodiments, if the calculated confidence score is below the threshold value, the predictive service request system 115 can determine that the automated service request resolution system 120 will not have sufficient information to properly resolve the service request. Instead of routing the service request information and predicted values as described above to the automated service request resolution system 120, the predictive service request system 115 can transmit the service request to a non-automated service request resolution system 125. In some embodiments, the predictive service request system 115 can utilize the predicted service request category to identify a specific support team to route the service request to.

Upon determining a resolution to the service request by either the automated service request resolution system 120 or the non-automated service request resolution system 125, the service request can be resolved by processes at 130. In some embodiments, that can include sending a part and a service technician to install the part to resolve the service request. In some embodiments providing a knowledge article to the user 105 can provide the guidance for the user 105 to resolve the service request through a series of steps outlined in the knowledge article. In some embodiments, a software update can manually or automatically be run on the affected system to resolve the service request. Any combination of necessary steps can be taken at 130 to resolve the service request.

Figure 2:
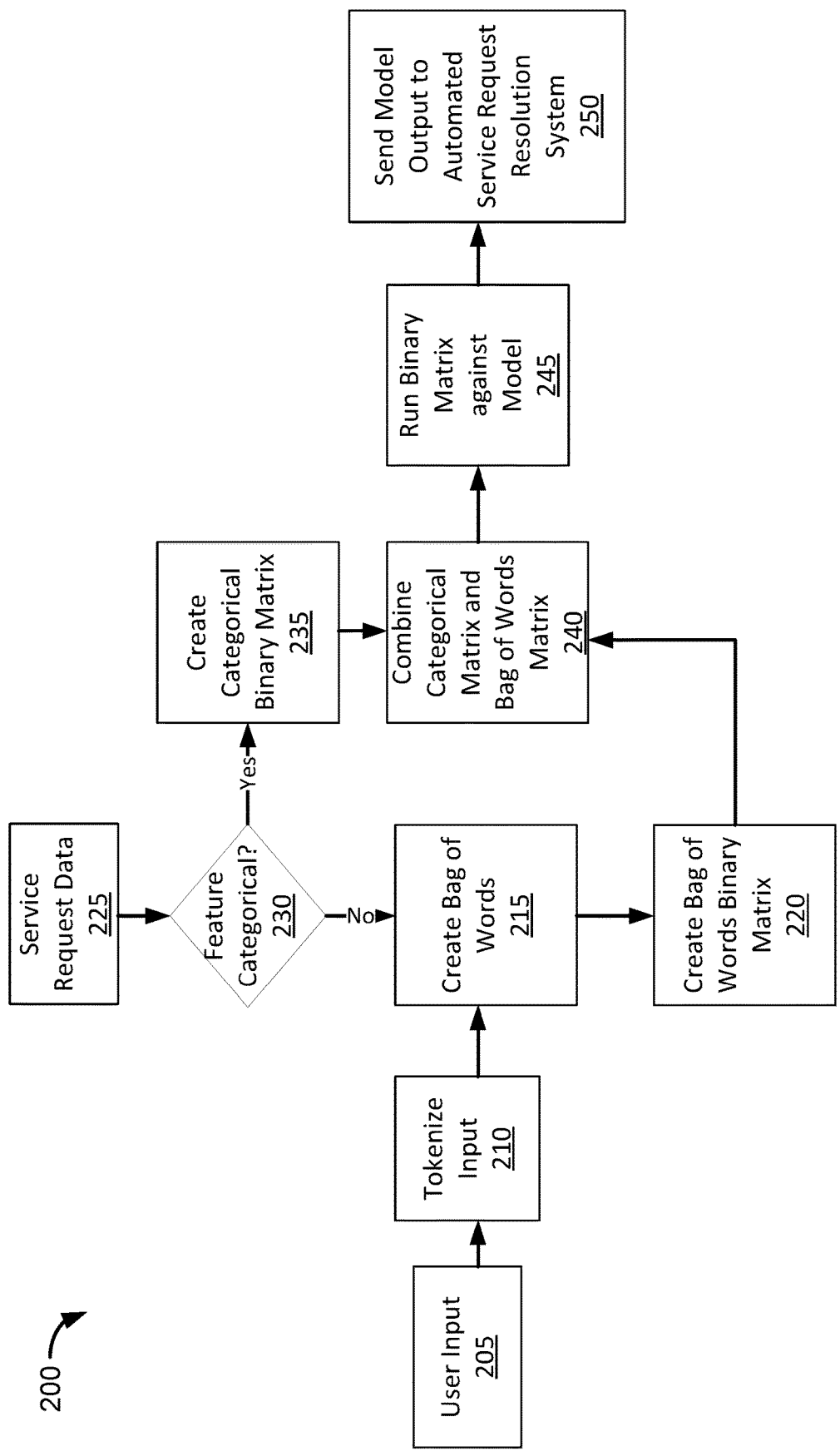
FIG. 2 depicts a flow chart of a predictive service request system, according to an embodiment.

FIG. 2 depicts a flow chart of a predictive service request system 200, which can be the predictive service request system 115 of FIG. 1. The predictive service request system 200 can include the ability to receive user input 205 and service request data 225. The user input 205 can be entered using an electronic submission form, such as, for example, on an internet or intranet page. The electronic submission form can include a portion for entry of a natural language description of the service request. In some embodiments, the natural language entry of the service request can be the only input. In some embodiments, the electronic submission form can include form elements that allow the user to enter information in response to specific questions such as, for example, part numbers, and other data that can be used to identify a resolution to the service request. In some embodiments, the user input 205 can be entered by a user into a computer system that allows the user to speak the issue and voice recognition software is used to turn the voice data into text that is submitted to the predictive service request system 200. Upon submission of the user input 205, the predictive service request system 200 can receive the service request submission.

The user input 205 can be tokenized into tokenized input 210. The user input can be processed prior to tokenizing to remove common words that may not be helpful (e.g., "a" or "the"), and a custom dictionary can be utilized to remove stop words from the user input. Once the stop words and other words that are undesirable are removed from the user input 205, the words that remain can be tokenized. Each word and phrase can be turned into a token as will be discussed in further detail with respect to FIG. 4.

The predictive service request system 200 can receive service request data 225. In some embodiments, the predictive service request system 200 can request the service request data 225 based on the submission of the user input 205. In some embodiments, the service request data 225 can be automatically sent by the affected system to the predictive service request system 200. The service request data 225 can include, for example, metadata including event codes, product numbers or information, serial numbers, and/or a selected problem category.

The predictive service request system 200 can determine whether the service request data contains feature information that is categorical at 230. For example, the service request data 225 can include a part number that can allow the predictive service request system to determine that a category of the service request is hardware. If the feature information allows for a determination that there is categorical information, the predictive service request system can create a categorical binary matrix 235 based on the categorical information provided in the service request data 225.

Feature information that is not categorical at 230 and the tokenized input 210 can be combined to create the bag of words 215. The bag of words 215 can be all the tokenized words and phrases the predictive service request system 200 has obtained from the user input 205 and the service request data 225 that can be used to predict the best resolution to the service request.

The bag of words can be turned into a bag of words binary matrix 220 by the predictive service request system 200. The bag of words binary matrix 220 can include an entry in the binary matrix for each tokenized entry in the bag of words 215.

The predictive service request system 200 can also create a categorical binary matrix 235 from the features that were categorical in the service request data 225. The categorical binary matrix 235 can include an entry in the binary matrix for each categorical feature. Categorical features can also include custom features. The custom features can be used to weight service request outcome models based on business rules.

The predictive service request system 200 can combine the categorical binary matrix 235 and the bag of words binary matrix 220 to have a single binary matrix 240 that contains an entry for every tokenized word or phrase in the bag of words and every categorical feature. The binary matrix 240 can be run against the service request outcome models from a database of service request outcome models. The database of service request outcome models can be, for example, the database 117 of FIG. 1. The service request outcome models can contain information that can be useful for determining a resolution to the service request, including, for example, a predicted service request category, resolution, diagnostic, and/or part. After running the binary matrix 240 against the service request outcome models, the predictive service request system 200 can identify the service request outcome model 245 that best fits the binary matrix 240.

Once the predictive service request system 200 identifies the service request outcome model 245 that best fits the binary matrix 240, the predictive service request system 200 can utilize the service request outcome model 245 to identify information that can be used to resolve the service request. The information can include, for example, a predicted service request category, a predicted service request resolution, a predicted service request diagnostic, and/or a predicted service request part.

In some embodiments, the predicted service request system 200 can send the predicted information to an automated service request resolution system 250 to resolve the service request. Automated service request resolution systems often require specific information in a specific format to automatically resolve a service request. The predictive service request system 200 can provide the information to the automated service request resolution system 250 in the appropriate format to ensure that the automated service request resolution system 250 can complete resolution of the service request. In some embodiments, the predictive service request system 200 can provide the predicted service request category, the predicted service request resolution, the predicted service request diagnostic, and/or the predicted service request part to the automated service request resolution system 250. The submission of the necessary information by the predictive service request system 200 can eliminate the need for the user to input information into the automated service request resolution system 250 in the necessary format for the automated service request resolution system 250 to automatically resolve the service request without human intervention from a support team.

Figure 3:
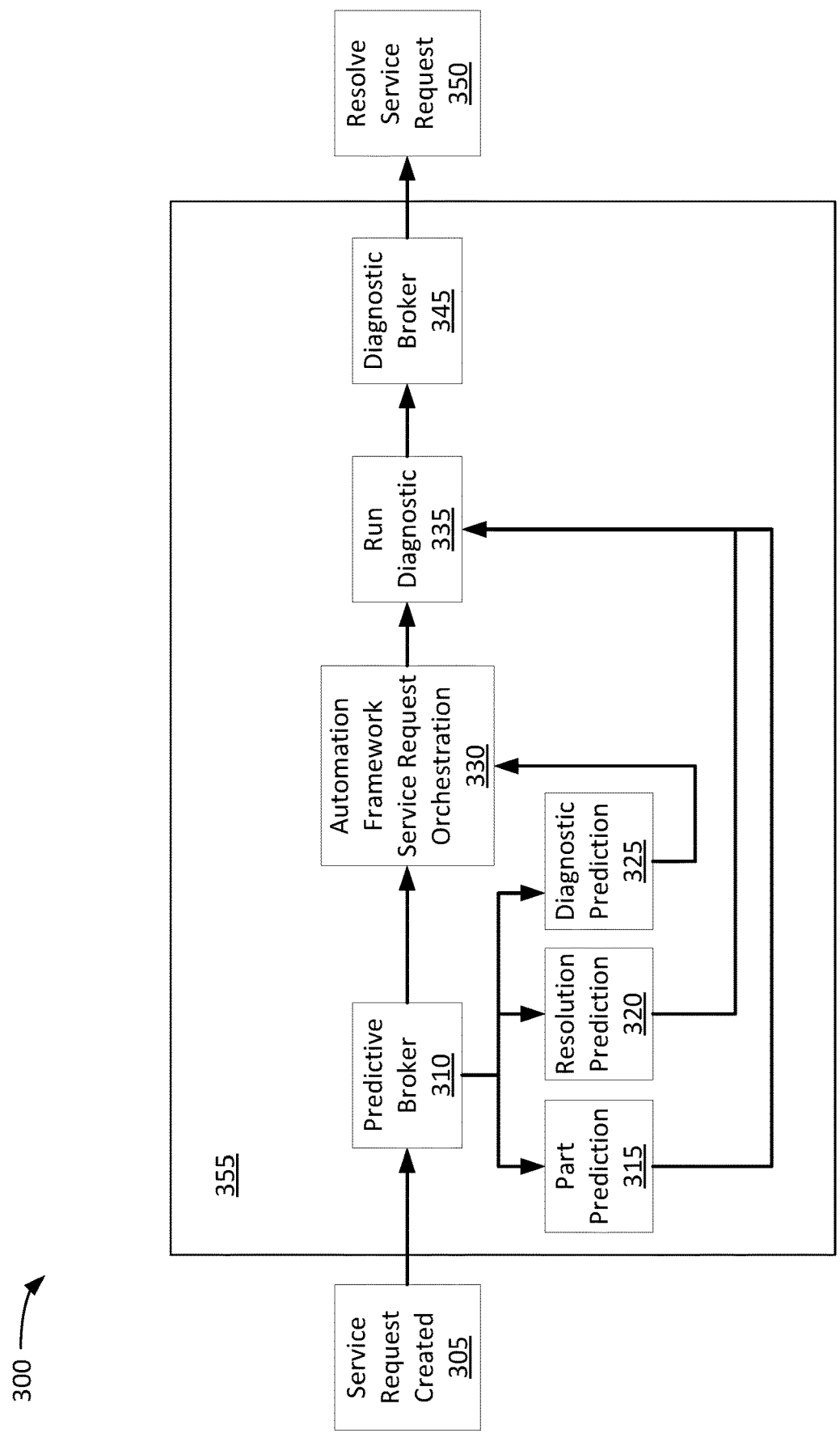
FIG. 3 depicts a block diagram of a predictive service request system, according to an embodiment.

FIG. 3 depicts a block diagram 300 of a predictive service request system 355. The service request is created at block 305. The service request can be created by entry of a service request by a user using any appropriate submission form. The submission can be using form entry information or natural language. In some embodiments, a service request can be created at block 305 from a system failure that results in an automatic transmission of information to a system that can create the service request. Once the service request is created, it is submitted to the predictive service request system 355, where the predictive broker 310 receives the service request.

The predictive broker 310 can delegate the natural language inputs to service recommenders. The process for identifying the service recommenders was described in more detail with respect to FIG. 2 above. The result can be a part prediction 315, a resolution prediction 320, and/or a diagnostic prediction 325. The diagnostic prediction can be sent to the automation framework service request orchestration 330. That information can be used to allow the automated service request resolution system (e.g., automated service request resolution system 250) to run the predicted diagnostic at 335 using the part prediction 315. The results of running the diagnostic 335 as well as the resolution prediction 320 can be sent to the diagnostic broker 345. The outcome of running the diagnostic can be reconciled with the part prediction 315, resolution prediction 320 and diagnostic prediction 325 to determine whether the predicted resolution 320 is accurate.

If the predicted resolution 320 is accurate, the predictive service request system 300 can have a high confidence value that the predicted resolution 320 will resolve the service request. In such cases, the predicted values can be sent to the automated service request resolution system to resolve the service request at 350. If the confidence value is not high, or if the resolution prediction 320 is not confirmed by the diagnostic broker 345, the predictive service request system 300 can send the service request instead to a support team to resolve the service request at 350.

Figure 4:
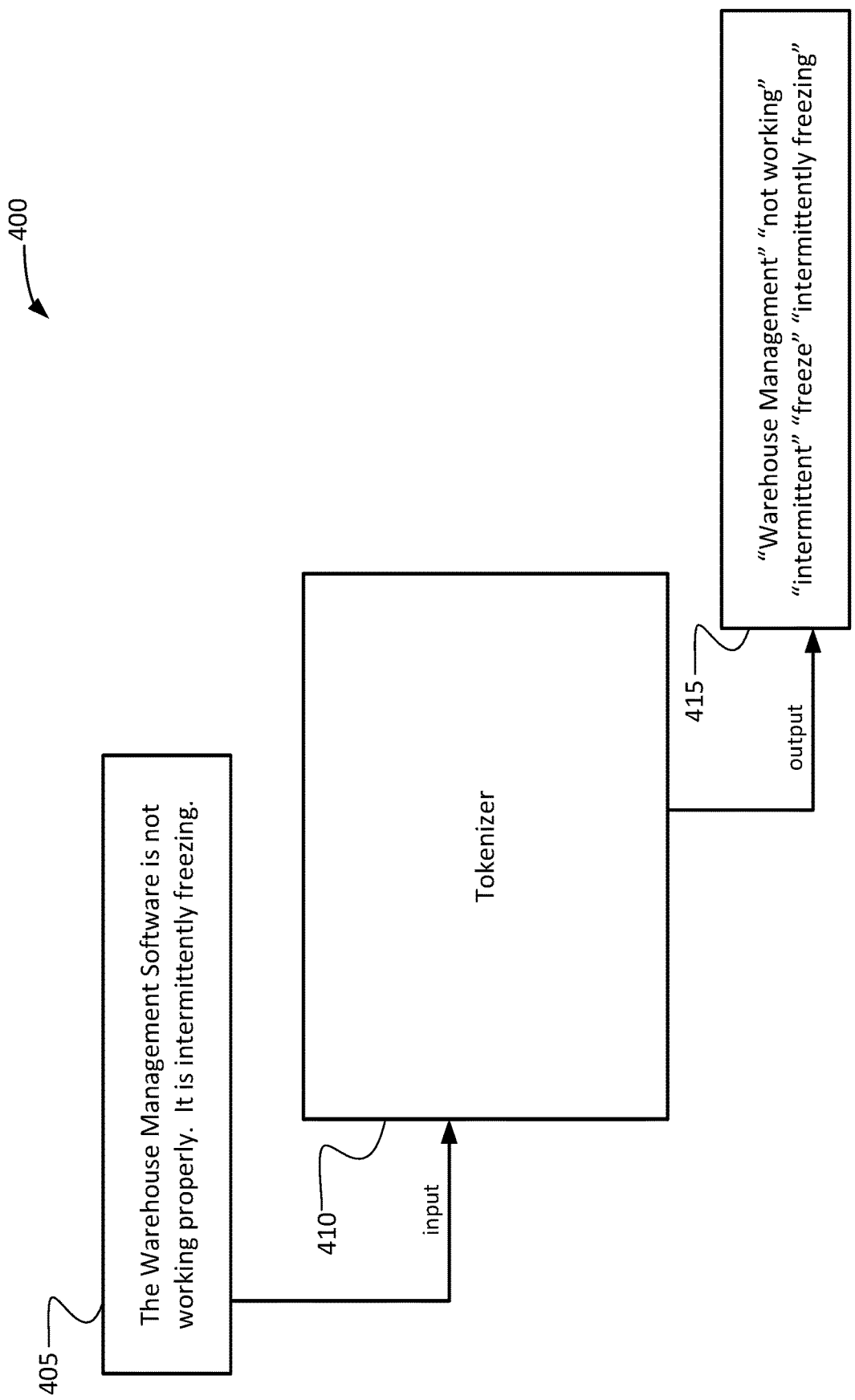
FIG. 4 is a simplified block diagram of a tokenizer portion of a predictive service request system with an exemplary input and output, according to an embodiment.

FIG. 4 depicts a simplified block diagram of a tokenizer portion 400 of a predictive service request system (e.g., predictive service request system 200) with an exemplary input and output. The block diagram includes an input 405, a tokenizer 410, and an output 415.

The input 405 can be the natural language user input entered into a service request system as described with respect to the previous figures. The input, in this example, is "The Warehouse Management Software is not working properly. It is intermittently freezing." That input 405 can be received by tokenizer 410. Prior to the input being received at tokenizer 410, or as part of tokenizer 410, the input 405 can be processed to have unnecessary and/or stop words removed from the input 405. In this example, the words "the," "is," and "it" can be removed. In some embodiments, a custom dictionary can be used to identify and remove stop words from the input 405. The custom dictionary can be configured and modified by an administrator of the system. In some embodiments, machine learning techniques can be used to identify words that generate failures or are otherwise undesirable can be automatically added to the custom dictionary.

The tokenizer 410 can use the remaining words from input 405 to create a set of tokens 415. The tokenizer 410 can use the words and phrases identified in the input 405 to create a token for each word and each phrase identified in the input 405. In the example, the words and phrases identified from input 405 are "Warehouse Management," "not working," "intermittent," "freeze," and "intermittently freezing." The output 405 includes a token for the word "intermittent" based on the entry of the word "intermittently." In some embodiments, the token can be "intermittently" instead of "intermittent." Also, the phrases "Warehouse Management" and "intermittently freezing" can be identified and assigned a token by tokenizer 410. In this example, "Warehouse Management" is the product name.

Figure 5:
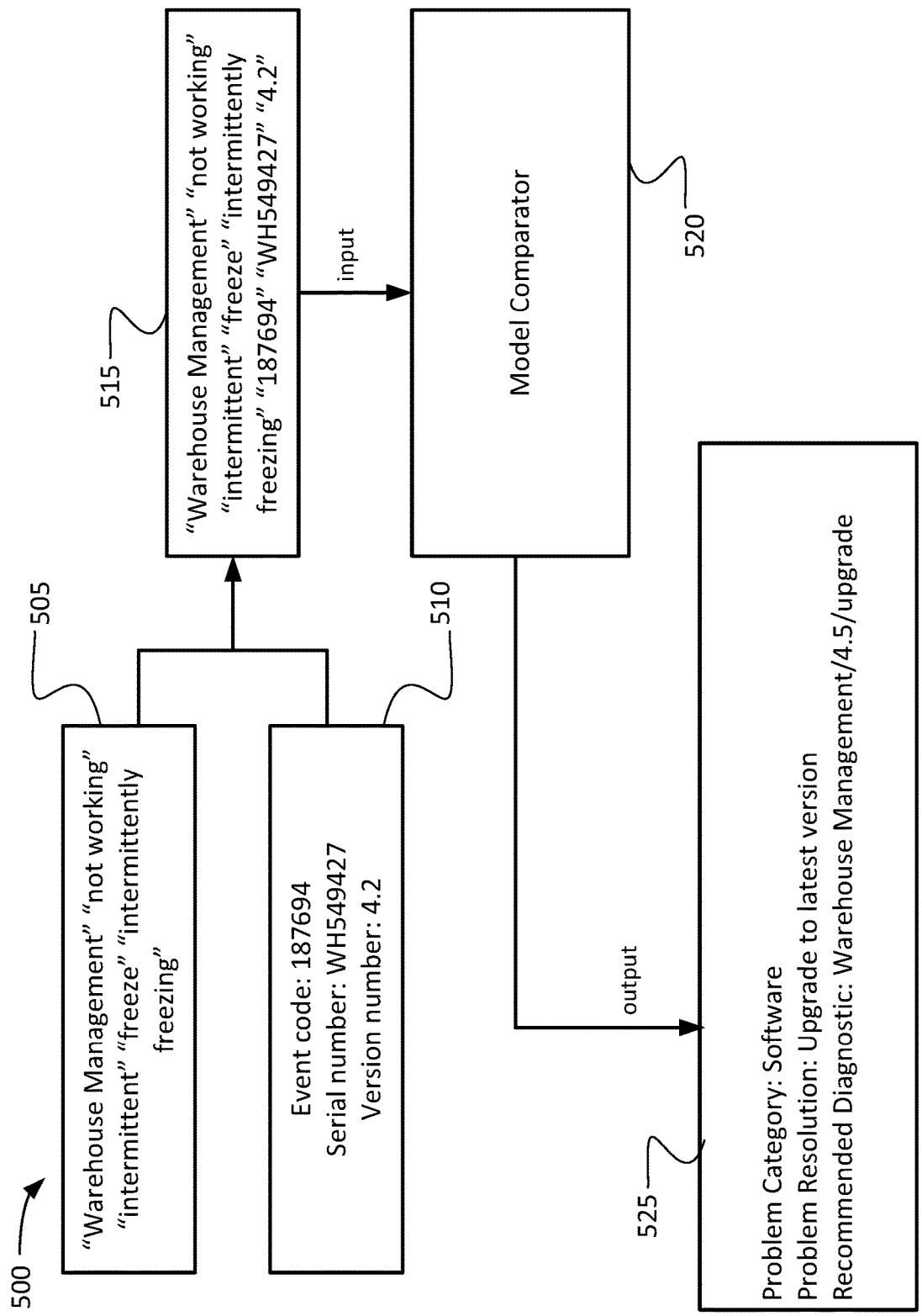
FIG. 5 is a simplified block diagram of a model comparator portion of a predictive service request system, according to an embodiment.

FIG. 5 depicts a simplified block diagram of a model comparator portion 500 of a predictive service request system (e.g., predictive service request system 355 of FIG. 3). The model comparator portion 500 of the predictive service request system can include tokenized input 505, metadata 510, combination data 515, a model comparator 520, and prediction outcome data 525.

The tokenized input 505 can be, for example, the tokenizer output 415 of FIG. 4, as is shown in this example. The metadata 510 can be, for example, an event code, serial number, and version number from the affected system. The metadata 510 can be, for example, the service request data 225 of FIG. 2. The tokenized input 505 and the metadata 510 can be combined to create the combination data 515 which can be run against the service request outcome models in the service request outcome model database (e.g., database 117 of FIG. 1). The combination data 515 is not shown as a binary matrix for human clarity, but can be the binary matrix 240 of FIG. 2. As shown in FIG. 5, the tokens from the tokenized input 505 can be combined with the metadata 510, which can also be tokenized in some embodiments. The combined data 515 can be input into the model comparator 520.

The model comparator 520 can run the combined data 515 against a number of service request outcome models from the database of service request outcome models. The service request outcome models can be entered in the database initially through a manual setup process. In some embodiments, a configuration program can be run that automatically populates the service request outcome model database with a set of service request outcome models based on information obtained from test runs of the predictive service request system.

The model comparator 520 can select a subset of service request outcome models from the service request outcome model database to run the combined data 515 against based on specific information contained in the combined data 515. For example, the model comparator 520 can identify the token that corresponds to the phrase "Warehouse Management" and identify the product as "Warehouse Management." Based on this identification, the model comparator 520 can select only service request outcome models that are related to software service requests because "Warehouse Management" is a software product. In some embodiments, the model comparator 520 can select only service request outcome models that are related to the Warehouse Management software program.

After the model comparator 520 runs the combined data 515 against the service request outcome models that are selected for comparing (i.e., either a subset or all of the models in the database), the model comparator 520 can select the service request outcome model that best fit the combined data 515.

The model comparator 520 can output the prediction outcome data 525 based on the selected service request outcome model. Each service request outcome model can identify prediction information including, for example, a predicted service request category, a predicted service request resolution, a predicted service request diagnostic, and/or a predicted service request part. The prediction outcome data 525 can include, a predicted service request category of "software," for example. In the example shown in FIG. 5, Warehouse Management is a software product, and the version currently running on the affected system is 4.2, based on metadata 510. Based on that information, the model comparator 520 can select a model that identifies the predicted service request category as "software." The selected service request outcome model can also identify that an upgrade to the latest version can resolve the issue, which can be output in the prediction outcome data 525 as the predicted service request resolution. Associated with the upgrade and identified by the selected service request outcome model can be a predicted service request diagnostic, for which a path may be identified, as shown in prediction outcome data 525. The predicted service request diagnostic can be, for example, a path to "Warehouse Management/ 4.5/upgrade," which can diagnose whether earlier versions can be upgraded to version 4.5 to resolve issues, for example.

Figure 6:
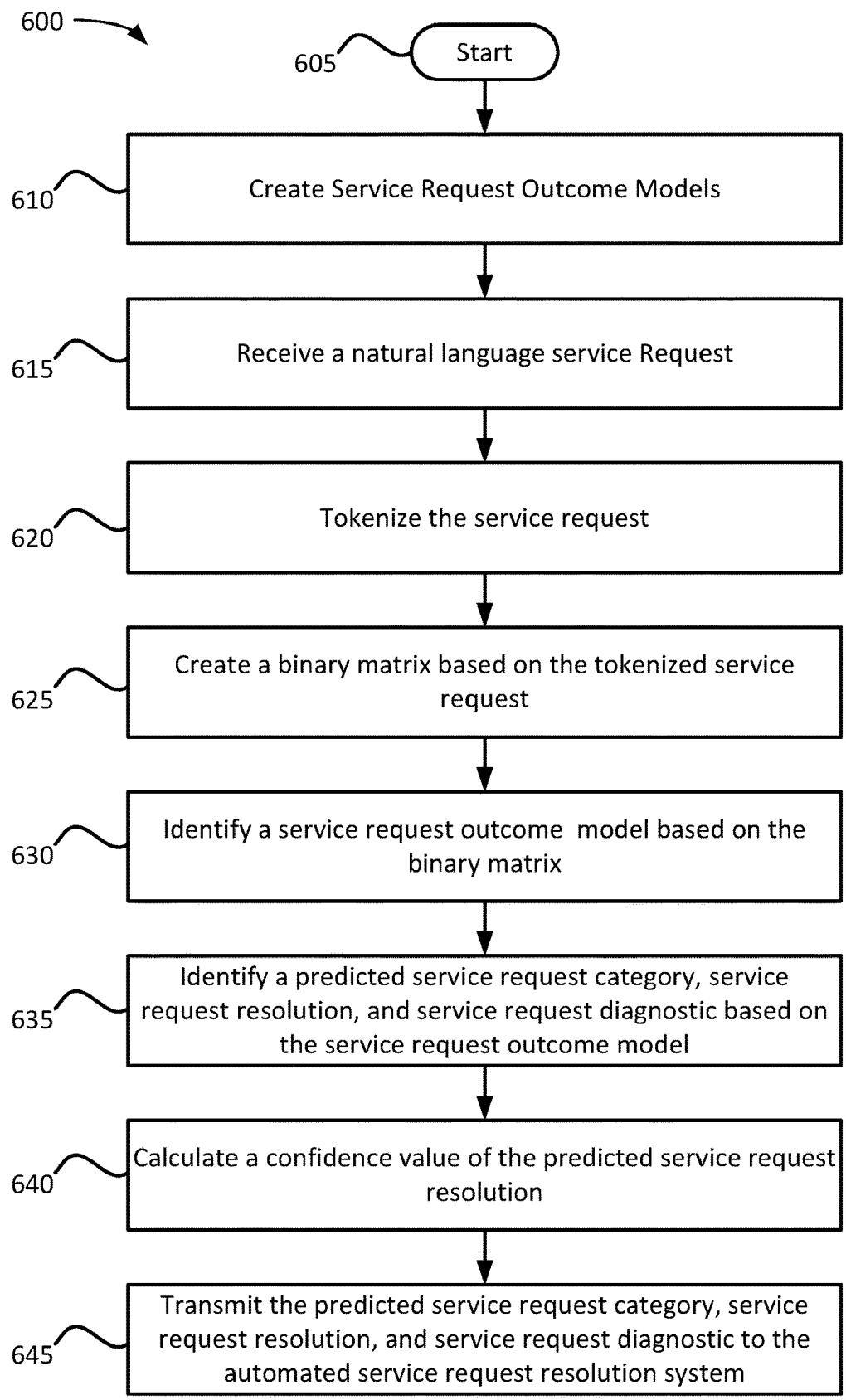
FIG. 6 is a flow diagram of a method of a predictive service request system, according to an embodiment.

FIG. 6 depicts a flow diagram of a method of a predictive service request system. The method can be executed with the systems described within FIGS. 1-5 above. The method begins at 605, and at 610 the method includes creating service request outcome models. The service request outcome models can be stored in a database, such as database 117 of FIG. 1. The service request outcome models can include information for identifying the type of service request that the outcome model is intended to resolve as well as information for resolving the service request. For example, a service request outcome model can include information about whether the included resolution is intended to resolve a hardware, firmware, or software service request. As another example, the service request outcome model can include the specific software, firmware, or hardware that it is intended to resolve including part numbers and/or version numbers. As another example, the service request outcome model can include the type of problem that the service request might be related to including broken parts, freezing software, or other specific keywords that can help to identify the appropriate service request outcome model. Additionally, the service request outcome model can include prediction information for diagnosing and resolving the service request. For example, the service request outcome model can include a predicted service request category, a predicted service request diagnostic, a predicted service request resolution, and/or a predicted service request part.

The service request outcome models can be generated in an initial configuration phase of the predictive service request system. For example, the models may be generated and uploaded manually based on service request information that is already known. Service request outcome models can also be automatically added to the database based on the operation of the predictive service request system. For example, upon each run of the predictive service request system, the service request may not precisely match any stored service request outcome models, so a new service request outcome model can be generated based on that service request and entered into the database.

At 615 the predictive service request system can receive a natural language service request. The service request can be entered by a user at any computer system that is communicatively coupled to the predictive service request system. The service request can be entered by the user in any suitable way. For example, the computer system can include a web interface allowing the user to type in a request. As another example, the computer system can allow the user to state the service request verbally, which the computer system can convert into a format accepted by the predictive service request system.

At 620 the predictive service request system can tokenize the service request. Each word and/or phrase of the service request that is not eliminated by a custom dictionary or otherwise determined to be unhelpful or undesirable can be turned into or assigned a token. Tokenizing is described in further detail with respect to FIGS. 1, 2, and 4.

At 625 the predictive service request system can create a binary matrix based on the tokenized service request. The binary matrix can include an entry for each token of the tokenized service request. In some embodiments, features collected by the predictive service request system through metadata or other information can be identified and also tokenized or otherwise included in the binary matrix for inclusion in the process of determining the predicted resolution of the service request.

At 630 the predictive service request system can identify a service request outcome model based on the binary matrix. The binary matrix can be run against multiple service request outcome models from the database of service request outcome models to identify the service request outcome model that best fits the binary matrix. In other words, the binary matrix can include information containing details of the service request and the affected system that requires service. The service request outcome models can be examined to find the one that contains a resolution for the problem most closely matching the service request. Machine learning and human trained algorithms are used to identify the closest match.

At 635 the predictive service request system can identify a predicted service request category, predicted service request resolution, and predicted service request diagnostic based on the service request outcome model. As described above, the service request outcome models include predicted information for use in resolving the service request. That predicted information can include a category, resolution, and diagnostic.

At 640 the predictive service request system can calculate a confidence value of the predicted service request resolution. As described with respect to FIG. 3, the diagnostic broker 345 can utilize the predicted information to run the diagnostic and reconcile the predictions to determine whether the predictions are accurate. Such reconciliation can include calculating a confidence value that predicted service request resolution is accurate.

At 645 the predicted service request category, predicted service request resolution, and the predicted service request diagnostic can be transmitted to the automated service request resolution system. As described with respect to FIG. 10, the predictive service request system can include a communications subsystem (e.g., communications subsystem 1024) to transmit the data. The predictive service request system additionally can include a processing unit (e.g., processing unit 1004) that can include instructions that, when executed, can instruct the communications subsystem to transmit the data to the automated service request system. Automated service request resolution systems can require inputs to be entered in a specific format or specific data to be entered. Failure to meet the automated service request resolution system requirements can result in the automated service request resolution system failing to be able to resolve the service request. In many cases, the result is that the service request is routed to a support team by the automated service request resolution system after receiving input, particularly from a user, that is insufficient to meet the requirements of the automated service request resolution system. The predictive service request system can provide the information required by the automated service request resolution system in the proper format, in many cases removing the requirement for human intervention. Additionally, the automated service request resolution system can have multiple workflows that allow the service request to be resolved, and the predictive service request system can submit the necessary information to the automated service request resolution system to invoke the proper workflow for the service request to be resolved automatically.

In some embodiments, if the information required by the automated service request resolution system is not obtained by the predictive service request system or the confidence value calculated at 640 is not high enough, the predictive service request system can route the service request to a support team. In such cases, the predictive service request system can, in some embodiments, utilize the predicted service request category or other service request information including the product name if available, to direct the service request to a specific support team. In other words, the predictive service request system can use intelligent routing to direct the service request to the appropriate destination.

Figure 7A:
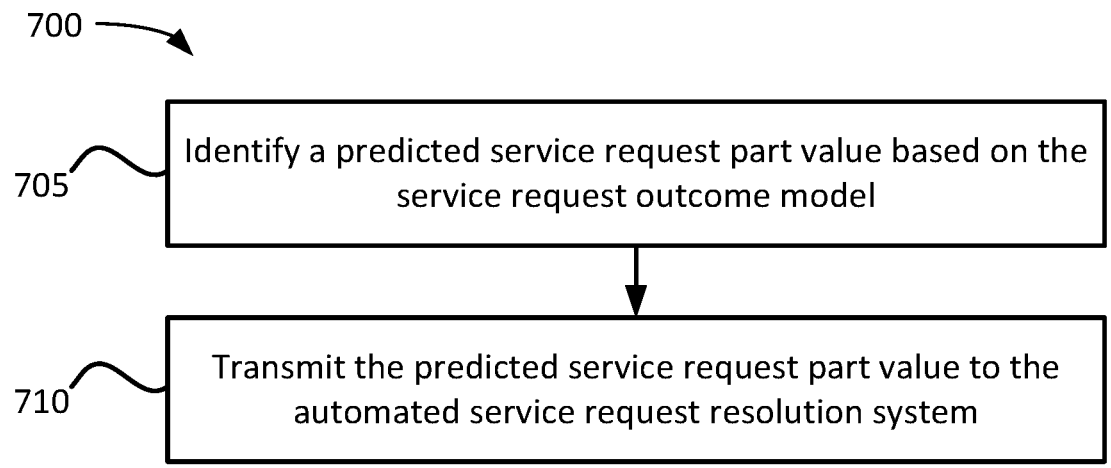
FIG. 7A is a flow diagram of a portion of a method of a predictive service request system, according to an embodiment.

FIG. 7A depicts a flow diagram of a portion of a method 700 of a predictive service request system. The portion of the method 700 can be executed with the method 600 described with respect to FIG. 6. At 705, the predictive service request system can identify a predicted service request part value based on the service request outcome model. The predicted service request part value can identify a part that can be used to fix the broken equipment that resulted in the service request.

At 710 the predictive service request system can transmit the predicted service request part value to the automated service request resolution system. The automated service request resolution system can utilize the predicted service request part value to resolve the service request. In some embodiments, the part can automatically be ordered and service technician can be scheduled automatically to install the part.

Figure 7B:
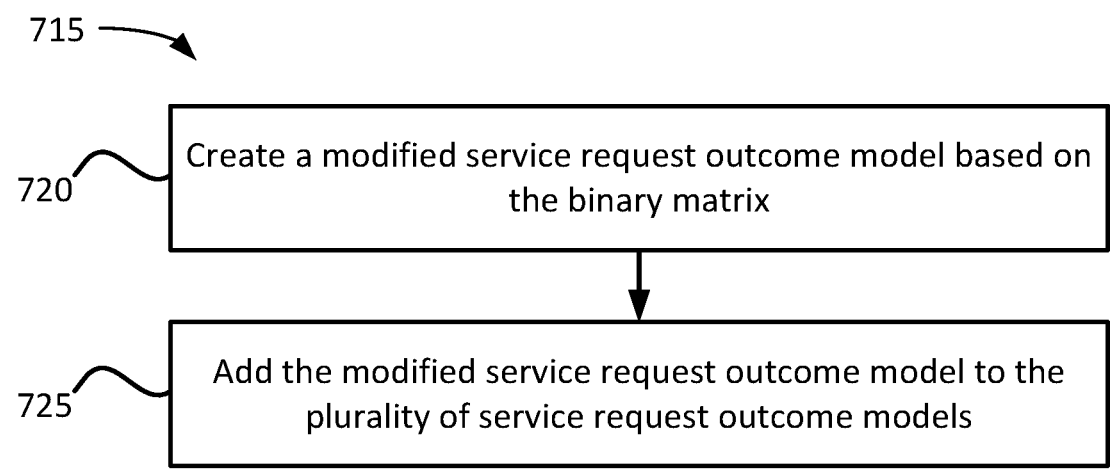
FIG. 7B is a flow diagram of another portion of a method of a predictive service request system, according to an embodiment.

FIG. 7B depicts a flow diagram of a portion of a method 715 of a predictive service request system. The portion of the method 715 can be executed with the method 600 described with respect to FIG. 6. At 720 the predictive service request system can create a modified service request outcome model based on the binary matrix. As described elsewhere herein, the service request outcome model that best fits the binary matrix can be selected from the service request outcome model database. In some embodiments, the binary matrix developed from the service request may not fit the service request outcome model precisely, in which case the predictive service request system can develop a new service request outcome model that fits the binary matrix precisely or better than the selected predictive service request outcome model.

At 725 the predictive service request system can add the modified service request outcome model to the service request outcome model database. Adding the modified service request outcome model to the database can make the modified model available to the predictive service request system for use in future selections of service request outcome models. In some embodiments, the model can be entered into a temporary database for approval before the model is added to the service request outcome model database for use in future runs of the predictive service request system.

Figure 8:
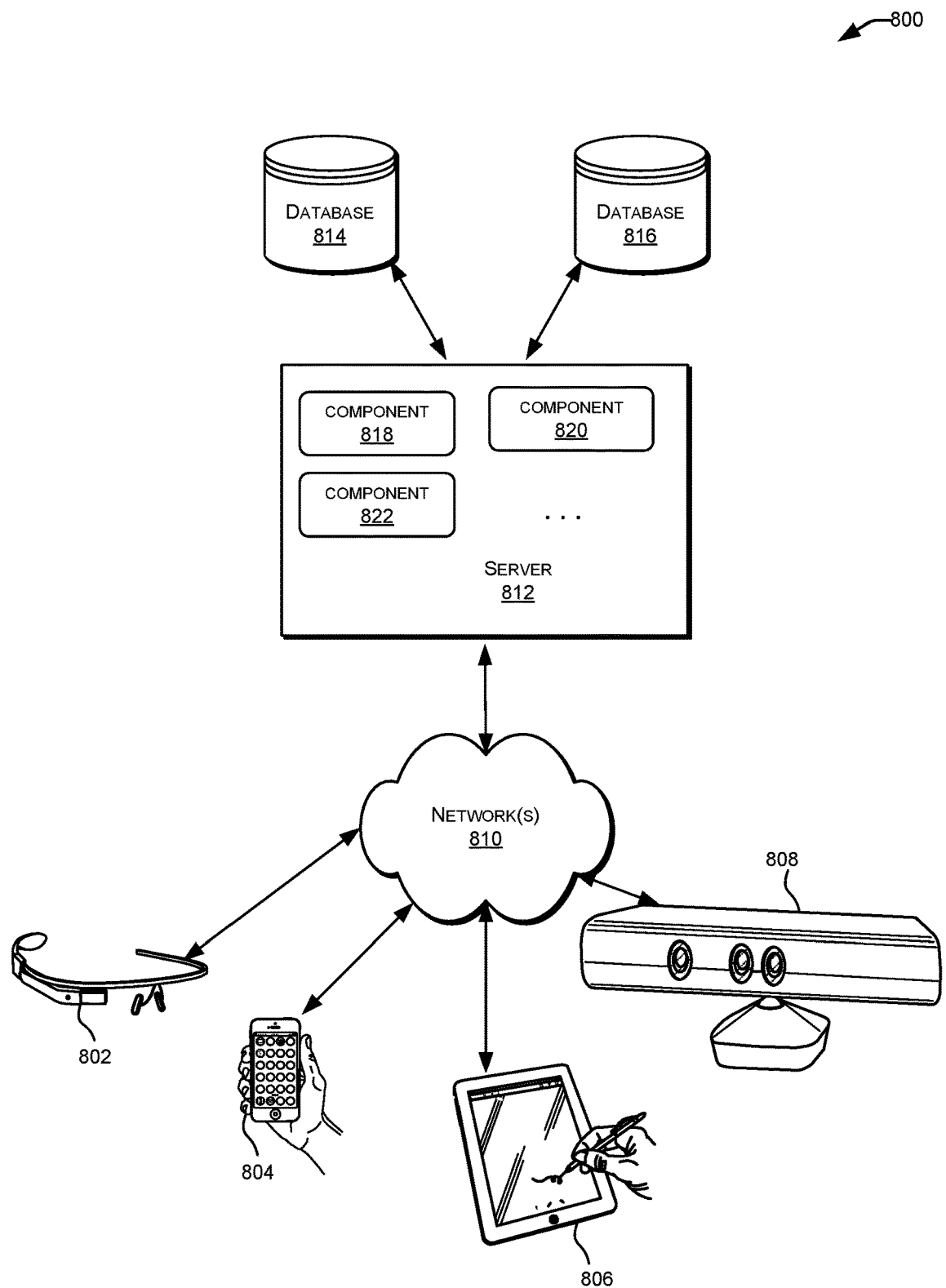
FIG. 8 depicts a simplified diagram of a distributed system for implementing one of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether twoor three-dimensional (3D) representations, page-based logical environments, or otherwise. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization. One or more flexible pools of logical storage devices can be virtualized to maintain virtual storage devices for the server. Virtual networks can be controlled by server 812 using software defined networking. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
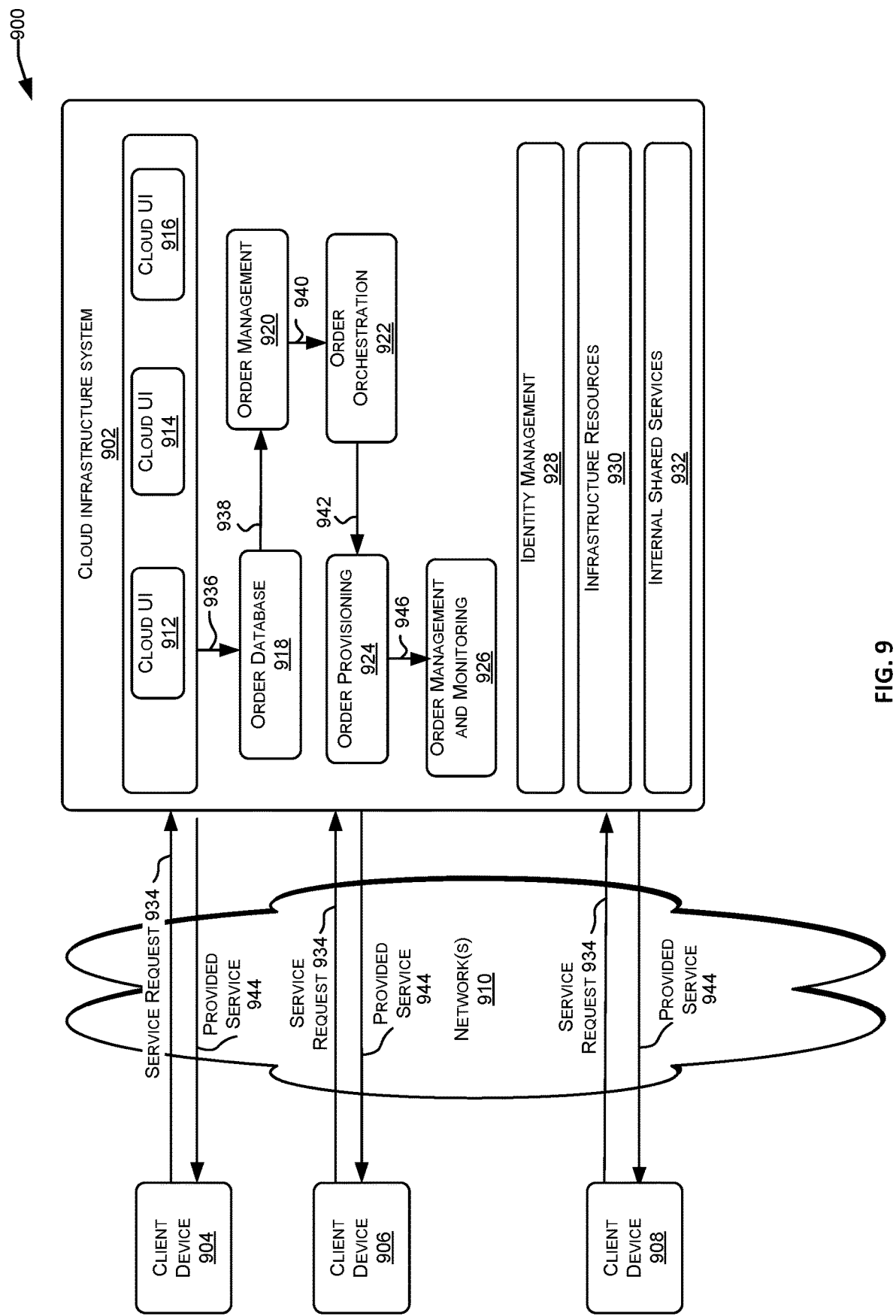
FIG. 9 is a simplified block diagram of components of a system environment by which services provided by the components of an embodiment system may be offered as cloud services, in accordance with an embodiment of the present disclosure.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
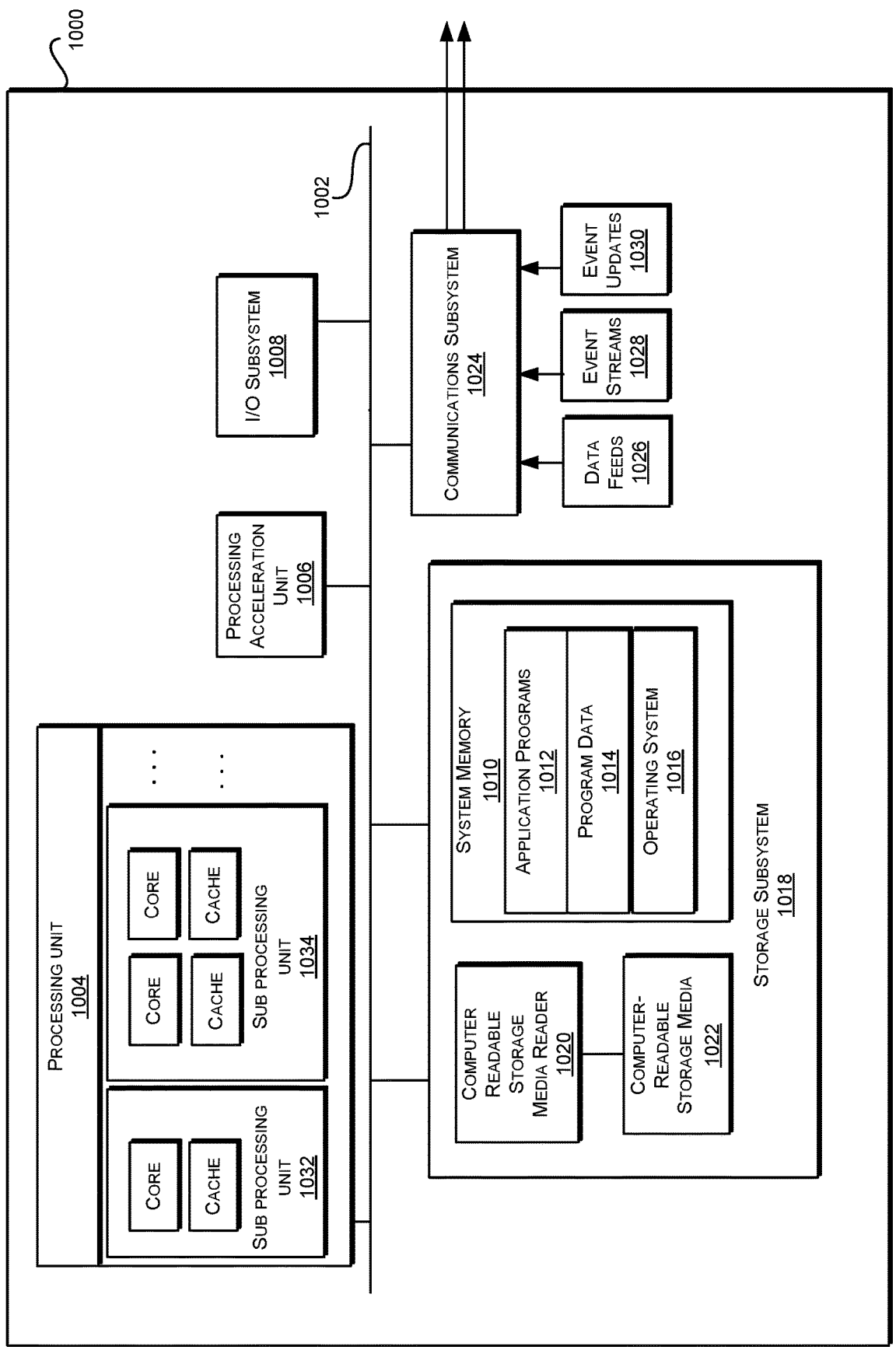
FIG. 10 illustrates an exemplary computer system, in which various embodiments of the present invention may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/ or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of detecting a hardware system failure, comprising:
   accessing, at a computer system comprising one or more processors, a plurality of service request outcome models, each of the plurality of service request outcome models usable for generating a predicted outcome corresponding to information that addresses one or more service requests;
   receiving, with the one or more processors, a user input comprising natural language input that characterizes one or more abnormal operations performed by a hardware system;
   tokenizing, with the one or more processors, the user input into a plurality of tokens;
   accessing, with the one or more processors, a service request data from the hardware system that performed the one or more abnormal operations;
   processing, with the one or more processors, the service request data to identify a set of categorical features and a set of non-categorical features associated with the hardware system;
   generating, with the one or more processors and based on the plurality of tokens from the user input and the set of non-categorical features identified from the service request data, a first bag-of-words binary matrix that includes an entry for each of the plurality of tokens and each non-categorical feature of the set of non-categorical features;
   generating, with the one or more processors, a second categorical binary matrix including an entry for each categorical feature of the set of categorical features;
   combining, with the one or more processors, the first bag-of-words binary matrix and the second categorical binary matrix to create a third binary matrix;
   generating, for each of the plurality of service request outcome models, a predicted outcome that corresponds to the third binary matrix;
   selecting, based on the predicted outcomes that correspond to the third binary matrix, a service request outcome model among the plurality of service request outcome models;
   identifying, with the one or more processors, one or more of a predicted service request category, a predicted service request resolution, or a predicted service request diagnostic based on the selected service request outcome model; and
   transmitting, with the one or more processors, the one or more of the predicted service request category, the predicted service request resolution, or the predicted service request diagnostic to an automated service request resolution system to resolve the service request.

2. The method of claim 1, further comprising:
   identifying, with the one or more processors, a predicted service request part value based on the selected service request outcome model; and
   transmitting, with the one or more processors, the predicted service request part value to the automated service request resolution system.

3. The method of claim 2, further comprising automatically initiating an order based on the predicted service request part value, and automatically scheduling an installation technician to install a service request part corresponding to the predicted service request part value, in response to the identification of the one or more of the predicted service request category, the predicted service request resolution, the predicted service request diagnostic, or the predicted service request part value at the automated service request resolution system.

4. The method of claim 1, further comprising:
receiving, at the computer system, a second user input relating to one or more abnormal operations performed by a second hardware system, the second user input comprising second natural language input;
in response to the second user input, accessing a second service request data from the second hardware system indicated in the second user input;
tokenizing, with the one or more processors, the second user input into a second plurality of tokens;
combining, with the one or more processors, the second plurality of tokens and the second service request data accessed from the second hardware system;
creating, with the one or more processors, an additional binary matrix based on the combined second plurality of tokens and the second service request data retrieved from the second hardware system;
executing a statistical model comparator on the additional binary matrix, to identify a second service request outcome model corresponding to the additional binary matrix;
identifying, with the one or more processors, a second predicted service request category, a second predicted service request resolution, and a second predicted service request diagnostic based on the second service request outcome model;
identifying, with the one or more processors, a technical support team based on the second predicted service request category; and
transmitting, with the one or more processors, the second user input to the technical support team to resolve the one or more abnormal operations performed by the second hardware system, wherein the technical support team includes one or more technical support personnel.

5. The method of claim 1, further comprising:
creating, with one or more processors, a modified service request outcome model based on the third binary matrix; and
adding, with the one or more processors, the modified service request outcome model to a plurality of service request outcome models.

6. The method of claim 1, further comprising:
eliminating, with the one or more processors, stop words based on a custom dictionary from the user input prior to tokenizing the user input.

7. The method of claim 1,
wherein the service request data includes at least two of an event code, a product name, a serial number, or a problem category.

8. The method of detecting a hardware system failure of claim 1, wherein a subset of categorical features correspond to one or more custom features that are used to weight each of the plurality of service request outcome models.

9. The method of detecting a hardware system failure of claim 1, wherein selecting, based on predicted outcomes that correspond to the third binary matrix, a service request outcome model among the plurality of service request outcome models comprises executing a machine learning algorithm to identify the service request outcome model as a closest match from the plurality of service request outcome models.

10. The method of detecting a hardware system failure of claim 1, wherein selecting, based on predicted outcomes that correspond to the third binary matrix, a service request outcome model among the plurality of service request outcome models further comprises:
executing a configuration program to populate each of the plurality of service request outcome models, based on output from a plurality of test runs of the automated service request resolution system.

11. The method of detecting a hardware system failure of claim 1, further comprising:
calculating a distance between the third binary matrix and the selected service request outcome model;
comparing the calculated distance to a threshold value; and
in response to determining that the calculated distance is less than the threshold value, routing the user input to a first automated service request resolution system; or
in response to determining that the calculated distance is not less than the threshold value, routing the user input to a second non-automated service request resolution system.

12. The method of claim 1, wherein tokenizing the user input into the plurality of tokens further comprises removing one or more tokens from the plurality of tokens based on a custom dictionary, the custom dictionary comprising a plurality of words identified by using a machine learning algorithm.

13. A hardware system failure detection system, comprising:
a processor; and
a memory coupled with and readable by the processor and storing therein a set of instructions which, when executed by the processor, causes the processor to:
access a plurality of service request outcome models, each of the plurality of service request outcome models usable for generating a predicted outcome corresponding to information that addresses one or more service requests;
receive a user input comprising natural language input that characterizes one or more abnormal operations performed by a hardware system;
tokenize the user input into a plurality of tokens;
access service request data from the hardware system that performed the one or more abnormal operations;
process the service request data to identify a set of categorical features and a set of non-categorical features associated with the hardware system;
generate, based on the plurality of tokens from the user input and the set of non-categorical features identified from the service request data, a first bag-of-words binary matrix that includes an entry for each of the plurality of tokens and each non-categorical feature of the set of non-categorical features;
generate a second categorical binary matrix including an entry for each categorical feature of the set of categorical features;
combine the first bag-of-words binary matrix and the second categorical binary matrix to create a third binary matrix;
generate, for each of the plurality of service request outcome models, a predicted outcome that corresponds to the third binary matrix;
select, based on the predicted outcomes that correspond to the third binary matrix, a service request outcome model among the plurality of service request outcome models;

identify one or more of a predicted service request category, a predicted service request resolution, or a predicted service request diagnostic based on the selected service request outcome model; and transmit the one or more of the predicted service request category, the predicted service request resolution, or the predicted service request diagnostic to an automated service request resolution system to resolve the service request.

14. The system of claim 13, wherein the instructions, when executed by the processor, further cause the processor to:

identify a predicted service request part value based on the selected service request outcome model; and transmit the predicted service request part value to the automated service request resolution system.

15. The system of claim 14, wherein, upon receipt of the one or more of the predicted service request category, the predicted service request resolution, the predicted service request diagnostic, or the predicted service request part value at the automated service request resolution system, a service request part is automatically ordered based on the predicted service request part value and an installation technician is automatically scheduled to install the service request part.

16. The system of claim 13, wherein the instructions, when executed by the processor, further cause the processor to:

receive a second user input relating to one or more abnormal operations performed by a second hardware system, the second user input comprising second natural language input;

in response to the second user input, access a second service request data from the second hardware system indicated in the second user input;

tokenize the second user input into a second plurality of tokens;

combine the second plurality of tokens and the second service request data accessed from the second hardware system;

create an additional binary matrix based on the combined second plurality of tokens and the second service request data retrieved from the second hardware system;

executing a statistical model comparator on the additional binary matrix, to identify a second service request outcome model corresponding to the additional binary matrix;

identify a second predicted service request category, a second predicted service request resolution, and a second predicted service request diagnostic based on the second service request outcome model;

identify a technical support team based on the second predicted service request category; and transmit the second user input to the technical support team to resolve the one or more abnormal operations performed by the second hardware system, wherein the technical support team includes one or more technical support personnel.

17. The system of claim 13, wherein the instructions, when executed by the processor, further cause the processor to:

create a modified service request outcome model; and
add the modified service request outcome model to a plurality of service request outcome models.

18. A non-transitory computer-readable memory device storing code representing instruction to be executed by a processor, the code comprising code to cause the processor to:

access a plurality of service request outcome models, each of the plurality of service request outcome models usable for generating a predicted outcome corresponding to information that addresses one or more service requests;

receive a user input comprising natural language input that characterizes one or more abnormal operations performed by a hardware system;

tokenize the user input into a plurality of tokens;

access service request data from the hardware system indicated that performed the one or more abnormal operations;

process the service request data to identify a set of categorical features and a set of non-categorical features associated with the hardware system;

generate, based on the plurality of tokens from the user input and the set of non-categorical features identified from the service request data, a first bag-of-words binary matrix that includes an entry for each of the plurality of tokens and each non-categorical feature of the set of non-categorical features;

generate a second categorical binary matrix including an entry for each categorical feature of the set of categorical features;

combine the first bag-of-words binary matrix and the second categorical binary matrix to create a third binary matrix;

generate, for each of the plurality of service request outcome models, a predicted outcome that corresponds to the third binary matrix;

select, based on the predicted outcomes that correspond to the third binary matrix, a service request outcome model among the plurality of service request outcome models;

identify one or more of a predicted service request category, a predicted service request resolution, or a predicted service request diagnostic based on the selected service request outcome model; and transmit the one or more of the predicted service request category, the predicted service request resolution, or the predicted service request diagnostic to an automated service request resolution system to resolve the service request.

19. The non-transitory computer-readable memory device of claim 18, wherein the code further comprises code to cause the processor to:

identify a predicted service request part value based on the selected service request outcome model; and transmit the predicted service request part value to the automated service request resolution system.

20. The non-transitory computer-readable memory device of claim 19, wherein, upon receipt of the one or more of the predicted service request category, the predicted service request resolution, the predicted service request diagnostic, or the predicted service request part value at the automated service request resolution system, a service request part is automatically ordered based on the predicted service request part value and an installation technician is automatically scheduled to install the service request part.

21. The non-transitory computer-readable memory device of claim 18, wherein the code further comprises code to cause the processor to:

receive a second user input relating to one or more abnormal operations performed by a second hardware system, the second user input comprising second natural language input;

in response to the second user input, access a second service request data from the second hardware system indicated in the second user input;

tokenize the second user input into a second plurality of tokens;

combine the second plurality of tokens and the second service request data accessed from the second hardware system;

create an additional binary matrix based on the combined second plurality of tokens and the second service request data retrieved from the second hardware system;

executing a statistical model comparator on the additional binary matrix, to identify a second service request outcome model corresponding to the additional binary matrix;

identify a second predicted service request category, a second predicted service request resolution, and a second predicted service request diagnostic based on the second service request outcome model;

identify a technical support team based on the second predicted service request category; and transmit the second user input to the technical support team to resolve the one or more abnormal operations performed by the second hardware system, wherein the technical support team includes one or more technical support personnel.

* * * * *

UNITED STATES PATENT AND TRADEMARK OFFICE
CERTIFICATE OF CORRECTION

PATENT NO. : 10,855,561 B2
APPLICATION NO. : 15/098521
DATED : December 1, 2020
INVENTOR(S) : Monahan et al.

Page 1 of 1

It is certified that error appears in the above-identified patent and that said Letters Patent is hereby corrected as shown below:

In the Specification

In Column 9, Lines 9-12, delete "FIG. 2. As shown in FIG. 5, the tokens from the tokenized input 505 can be combined with the metadata 510, which can also be tokenized in some embodiments. The combined data 515 can be input into the model comparator 520." and insert the same on Column 9, Line 8 as a continuation of the same paragraph.

In Columns 20-21, Lines 61-67 (Column 20) 1-4 (Column 21), delete "Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands." and insert the same on Column 20, Line 60 as a continuation of the same paragraph.

In the Claims

In Column 28, Line 15, in Claim 18, before "that" delete "indicated".

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*